(12) United States Patent
Heyring et al.

(10) Patent No.: US 9,731,798 B2
(45) Date of Patent: Aug. 15, 2017

(54) STABILISING OF MARINE BODIES

(71) Applicant: Nauti-Craft Pty Ltd, West Australia (AU)

(72) Inventors: Christopher Brian Heyring, Western Australia (AU); Richard Monk, Western Australia (AU); Michael Longman, Western Australia (AU)

(73) Assignee: NAUTI-CRAFT PTY LTD, Western Australia (AU)

( * ) Notice: Subject to any disclaimer, the term of this patent is extended or adjusted under 35 U.S.C. 154(b) by 6 days.

(21) Appl. No.: 14/780,279

(22) PCT Filed: Mar. 25, 2014

(86) PCT No.: PCT/AU2014/000310
§ 371 (c)(1),
(2) Date: Sep. 25, 2015

(87) PCT Pub. No.: WO2014/153600
PCT Pub. Date: Oct. 2, 2014

(65) Prior Publication Data
US 2016/0039500 A1    Feb. 11, 2016

(30) Foreign Application Priority Data

Mar. 25, 2013  (AU) ................ 2013901027

(51) Int. Cl.
*B63B 1/14*  (2006.01)
*B63B 39/04* (2006.01)
(Continued)

(52) U.S. Cl.
CPC ............. *B63B 39/04* (2013.01); *B63B 1/14* (2013.01); *B63B 17/0081* (2013.01);
(Continued)

(58) Field of Classification Search
CPC ........................................................ B63B 1/14
(Continued)

(56) References Cited

U.S. PATENT DOCUMENTS 3,812,806 A * 5/1974 Korotkov ............... B63B 1/286
114/126
5,207,408 A * 5/1993 Burg ..................... B63B 29/02
114/284
(Continued)

FOREIGN PATENT DOCUMENTS

AU  WO 2009052549 A1 * 4/2009  ............. B63B 39/04
CN     201999173 U    10/2011
(Continued)

OTHER PUBLICATIONS

International Search Report for PCT/AU2014/000310 dated May 28, 2014 (3 pages).
(Continued)

*Primary Examiner* — Lars A Olson
*Assistant Examiner* — Jovon Hayes
(74) *Attorney, Agent, or Firm* — Michael Best & Friedrich LLP

(57) ABSTRACT

A vessel having at least one hull, a body and a suspension system for supporting at least a portion of the body above the at least one hull is described. The suspension system includes at least one support means, and the vessel further includes at least one gyroscopic stabilizer for attenuating rotation of the body about at least one stabilizing axis.

22 Claims, 5 Drawing Sheets

(51) Int. Cl.
  G01C 19/44 (2006.01)
  G01C 19/46 (2006.01)
  *B63B 27/30* (2006.01)
  *B63B 17/00* (2006.01)
  *B63B 21/00* (2006.01)

(52) U.S. Cl.
  CPC ............. G01C 19/44 (2013.01); G01C 19/46 (2013.01); *B63B 21/00* (2013.01); *B63B 27/30* (2013.01); *B63B 2001/145* (2013.01); *B63B 2017/0072* (2013.01)

(58) Field of Classification Search
  USPC .............................................. 114/61.1–61.15
  See application file for complete search history.

(56) References Cited

U.S. PATENT DOCUMENTS

| | | | | |
|---|---|---|---|---|
| 5,839,386 | A * | 11/1998 | Frieling | B63B 1/22 114/121 |
| 7,743,720 | B1 * | 6/2010 | Salani | B63B 1/14 114/122 |
| 9,073,605 | B2 * | 7/2015 | Hall | B63B 17/0081 |
| 9,217,752 | B2 * | 12/2015 | Helenelund | B63B 39/00 |
| 2006/0144311 | A1 | 7/2006 | Heyring et al. | |
| 2009/0114136 | A1 * | 5/2009 | Ayres | G05D 1/0875 114/122 |
| 2013/0068151 | A1 * | 3/2013 | Heyring | B63B 1/14 114/61.15 |
| 2013/0213288 | A1 * | 8/2013 | Hall | B63B 17/0081 114/85 |
| 2016/0039500 | A1 * | 2/2016 | Heyring | B63B 39/04 114/61.15 |

FOREIGN PATENT DOCUMENTS

| | | |
|---|---|---|
| EP | 1873052 | 1/2008 |
| FR | 2546474 | 11/1984 |
| WO | 2009/052549 A1 | 4/2009 |

OTHER PUBLICATIONS

International Preliminary Report on Patentability for PCT/AU2014/000310 dated Jun. 24, 2015 (57 pages).

European Search Report for Application No. 14776203.3 dated Nov. 22, 2016 (7 pages).

* cited by examiner

STABILISING OF MARINE BODIES

FIELD OF THE INVENTION

The present invention is generally directed to vessels including suspension and in particular to stabilisation of the suspended body of a vessel.

BACKGROUND OF THE INVENTION

There are known many applications of gyroscopes to the stabilising of conventional mono-hull vessels, primarily about the roll axis. There are also known various designs of vessel in which the body, cabin or superstructure is suspended above one or more hulls. There are also known actively controlled gangways for minimising the change in distance between a platform connected to the vessel and an adjacent structure such as a pylon, jetty or another vessel.

Stabilising a mono-hull vessel about the pitch axis is difficult compared to the roll axis. Vessels including suspension of the body above one or more hulls require active control of preferably interconnected suspension to minimise the change in distance between a point on the body and a point on the adjacent structure, hence the use of gangways. However, actively controlled gangways are extremely limited in their load capability, add substantial mass requiring a large host vessel and provide no benefit to the vessel occupants while in transit.

SUMMARY OF THE INVENTION

One or more forms of the present invention may provide a vessel having:
- at least two hulls;
- a body; and
- a suspension system for supporting at least a portion of the body above the at least two hulls, the suspension system including:
  - at least one support means between each hull and the body; and
  - locating means, each respective locating means locating a respective hull relative to the body;
- wherein the vessel further includes at least one gyroscopic stabilizer for attenuating rotation of the body about at least one stabilising axis.

The or each at least one gyroscopic stabilizer may include a flywheel connected to a spin shaft such that the flywheel is able to spin about a spin axis, the spin shaft being connected to a gimbal frame, the gimbal frame being rotatably connected to the body of the vessel such that the gimbal frame is able to rotate about a precession axis, the spin axis being substantially perpendicular to the precession axis.

The at least one gyroscopic stabilizer may be a roll stabilising gyroscope and the at least one stabilising axis may be a roll axis, the precession axis being substantially perpendicular to the roll axis.

Additionally or alternatively, the at least one gyroscopic stabilizer may be a pitch stabilising gyroscope and the at least one stabilising axis may be a pitch axis, the precession axis being substantially perpendicular to the pitch axis.

The rotation of the gimbal frame about the precession axis may be damped either passively or preferably controlled, such as semi-actively, by a precession control device. Additionally or alternatively, the rotation of the gimbal frame about the precession axis may be driven (i.e. actively controlled) by a precession control device. In either case, the precession control device may be controlled to reduce or maintain a distance between a point on the body of the vessel and a reference point, which may be fixed such as on a pylon or landing jetty, or moving such as on a mother-ship.

The at least one support may include at least two fluid-filled supports interconnected by interconnection means. The interconnection means may provide fluid communication, or permit effective fluid transfer, between the at least two fluid-filled supports such that the at least two supports provide substantially zero stiffness in response to roll and/or pitch motions of the body relative to the at least one hull.

Alternatively or additionally, the at least one support may include at least four controllable support devices and the suspension system may further include an active control system for controlling the controllable support devices, for example, in dependence on sensors to enable minimisation of torques into the body from waves. The active control system may provide active control to adjust a roll, and/or pitch position of the body with respect to the at least one hull and/or to absorb and store power from motions between the hull(s) and the body due to wave inputs and supply power to drive motion of the support devices between the hull(s) and the body where required).

The at least one hull may include at least one left hull and at least one right hull.

The at least one support may include: at least a front left support and a back left support connected between the at least one left hull and the body; at least a front right support and a back right support connected between the at least one right hull and the body.

The suspension system may include at least one interconnection means for providing interconnection between at least two of said supports.

The front left, back left, front right and back right supports may each include at least a respective fluid filled compression chamber, the at least one interconnection means providing fluid communication, or permitting effective transfer of fluid, between at least two of said fluid filled compression chambers to thereby provide substantially zero stiffness in a roll, pitch and/or warp mode of the front left, back left, front right and back right supports.

The interconnection means may include control means for selectively permitting, limiting or preventing fluid communication (or said effective transfer of fluid). The control means may selectively limit or selectively prevent said fluid communication when said at least one gyroscopic stabilizer is not in operation. For example, if the control means operates to permit fluid communication in a roll circuit, then substantially zero roll stiffness is provided from said at least two interconnected supports, and a roll stabilising gyroscope is used to provide roll stabilisation of the body. Conversely, if the control means operates to limit or prevent fluid communication in the roll circuit, then the roll stiffness of the vessel suspension is not low and the roll stabilising gyroscope is not placed in operation.

The at least one left hull, the at least one right hull and the body may engage with a water surface. In this case, the body is partially supported directly by the displacement of water by a hull portion of the body for example, with the suspension system partially supporting the body, i.e. the body can include a hull portion directly supporting a portion of the body mass above the water and the remaining portion of the total body mass is supported above the at least one left and right hulls via the suspension system. Alternatively the at least one left hull and the at least one right hull may engage with a water surface and the suspension system may be arranged to support the entire mass of the body above the water surface, i.e. the body does not engage with the water surface (when the vessel is at rest in calm water).

The suspension system may include locating means for locating the body relative to the at least one hull, such as suspension geometry, for example wishbones, leading or trailing arms.

The or each at least one support may include an independent resilient support means.

Alternatively or additionally, the or each at least one support may include an interconnected (or modal) support means and an independent resilient support means.

The vessel may carry a first load such as people (passengers and/or crew), cargo and/or equipment, the first load being carried by the body. In this case motions and accelerations of the body are ideally within a limited but safe range (such as maximum acceleration profiles vs frequency and time for acceptable human motion comfort or physical endurance) suitable for the first load. The or each hull does not need to be restricted to the same limited range of motions and accelerations as the first load, so is relatively free to follow the water surface.

It will be convenient to further describe the invention by reference to the accompanying drawings which illustrate preferred aspects of the invention. Other embodiments of the invention are possible and consequently particularity of the accompanying drawings is not to be understood as superseding the generality of the preceding description of the invention.

DESCRIPTION OF PREFERRED EMBODIMENT

Figure 1:
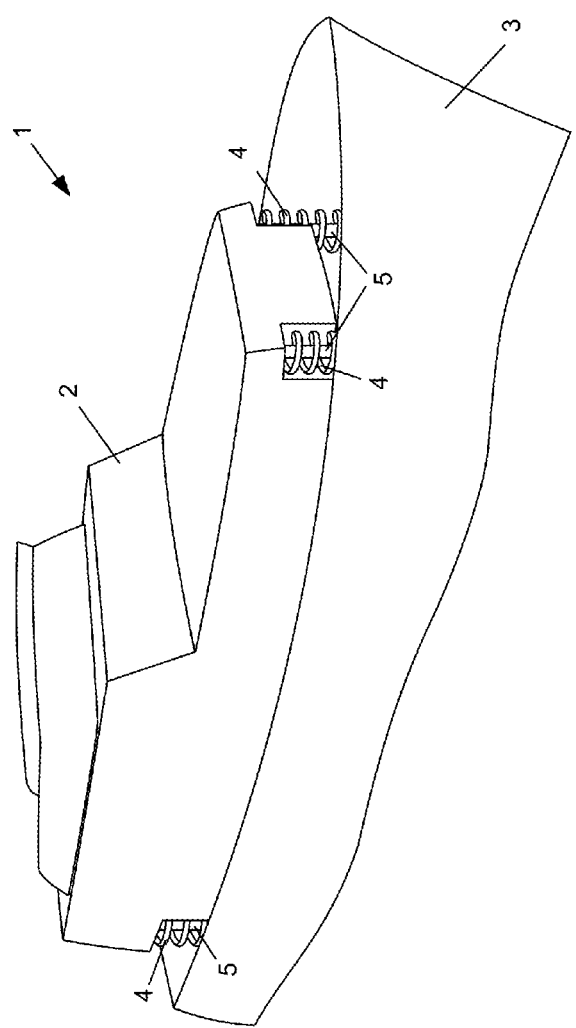
FIG. 1 is a perspective view of a gyro-stabilised monohull vessel.

Referring initially to FIG. 1 there is shown a mono-hull type vessel 1 having a body or cabin portion 2 supported above a single water engaging hull 3 by independent coil springs 4. Along the central axis of each coil spring is a ram 5 which can be a simple passive hydraulic damper, a controlled damper, a linear actuator/generator, a hydropneumatic ram or an interconnected hydraulic ram having at least one chamber connected to one of the other rams 5.

Figure 2:
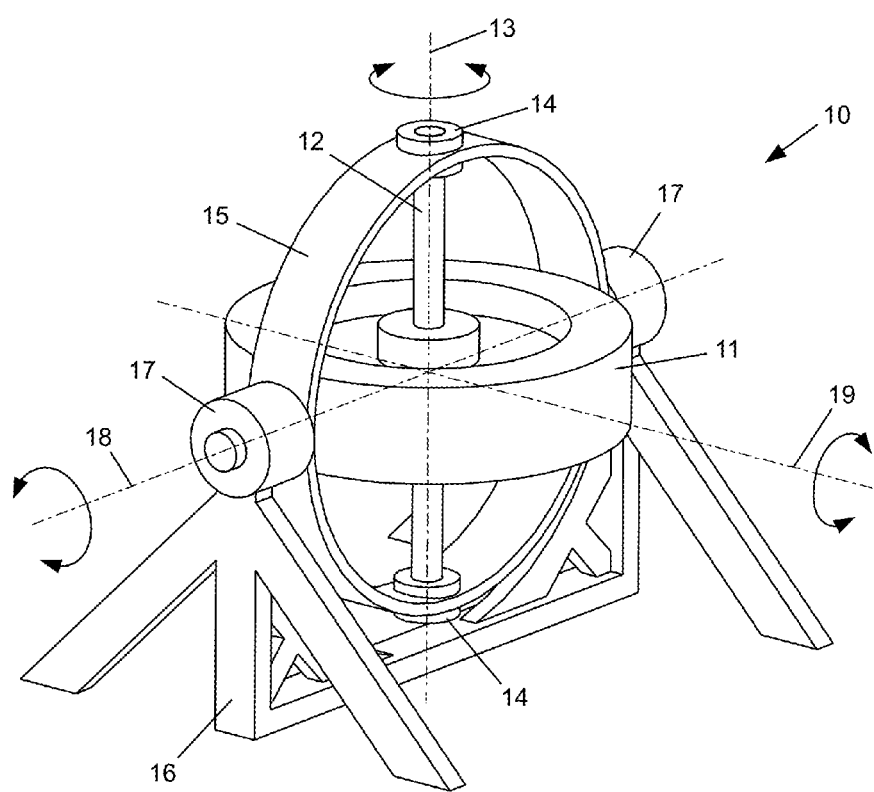
FIG. 2 is a schematic view of a stabilising gyroscope for a vessel.

FIG. 2 shows a stabilising gyroscope 10 having a flywheel 11 located on a spin shaft 12. The spin shaft 12 is mounted to a gimbal frame 15. Preferably the flywheel 11 is fixed to the spin shaft 12 which is mounted to the gimbal frame via spin bearings 14 so the flywheel and spin shaft can spin around the spin axis 13. The spin shaft is preferably driven by a spin motor near one of the spin bearings 14.

The gimbal frame 15 is mounted to a supporting structure 16 via precession bearings 17 such that it can rotate about the precession axis 18 relative to the supporting structure 16 which is fixed to the body (i.e. cabin or superstructure) of the vessel. The precession axis 18 is perpendicular to the spin axis 13. When the flywheel 11 is spinning about the spin axis and the gimbal rotation is driven about the precession axis 18, a gyroscopic torque is produced about the stabilising axis 19. The flywheel 11 has a high moment of inertia as the magnitude of the gyroscopic torque (used here as a stabilising force) is related to the moment of inertia of the flywheel and its spin speed (angular velocity).

In the orientation shown in FIG. 2, the spin axis is oriented generally vertically, the precession axis is oriented generally laterally relative to the vessel and the stabilising axis is oriented generally longitudinally relative to the vessel. Therefore the gyroscope shown in FIG. 2 with a horizontal flywheel (having a vertical spin axis) and a lateral precession axis, produces a gyroscopic torque in a roll direction of the vessel. As the hull of the vessel rolls, due for example to wave motion, the roll of the hull is transmitted to the body of the vessel by the suspension (if the suspension has stiffness or damping in the roll mode). Roll of the body rotates the supporting structure 16 of the gyroscope about the roll axis 19. Due to the rotation of the flywheel 11, a roll displacement will generate precession of the gimbal frame 15. If the rotation of the gimbal frame 15 about the precession axis 18 is damped, increasing the precession damping improves attenuation of the roll motion of the body of the vessel.

Similarly, actively controlling (driving) the rotation of the gimbal frame 15 about the precession axis 18 allows the roll attitude of the body of the vessel to be adjusted, so roll can be prevented or the body can even be rolled in the opposite direction to roll of the hull. Driving the precession angle can allow any desired roll angle at any time up to the limits of the permissible or effective precession angle of the gimbal frame 15.

Precession damping or driving of the precession angle of the gimbal frame 15 can be achieved by any known precession control device such as a rotary actuator adjacent or integrated with the precession bearings 17, or such as a linear actuator fixed to the supporting structure and the gimbal frame 15 to apply a torque about the precession axis 18.

A roll stabilising gyroscope can alternatively be located with the spin axis oriented laterally and the precession axis oriented vertically to give a longitudinally oriented stabilising axis (i.e. rotating the example illustrated in FIG. 2 by ninety degrees about the roll axis 19).

Similarly the gyroscope can be oriented to stabilise or control pitch motions of the body of the vessel. If the flywheel is disposed generally horizontal as shown in FIG. 2 with a vertical spin axis, using a longitudinal precession axis gives a lateral (i.e. pitch) stabilising axis. This can be achieved by rotating the example gyroscope 10 illustrated in FIG. 2 by ninety degrees in yaw, i.e. about the spin axis 13. Alternatively, if the flywheel 11 is disposed generally vertical with a longitudinally oriented spin axis and a precession axis oriented vertically, the stabilising axis will be laterally oriented and thereby parallel to a pitch axis.

More than one gyroscope can be used to stabilise the body of the vessel. For example, a roll stabilising gyroscope and a pitch stabilising gyroscope can be used on the same vessel. Also one or more of the roll or pitch gyroscopes (or both roll and pitch gyroscopes) can be replaced with a pair of gyroscopes so that any spurious stabilising torques produced at large precession angles cancel each other out.

The present invention can be applied to multi-hull vessels with suspension between the body and the hulls such as those disclosed in the applicant's earlier Australian patent number 2003249785 and Australian patent application numbers 2011256121 and 2011256123, the disclosures of which are incorporated herein by reference.

Figure 3:
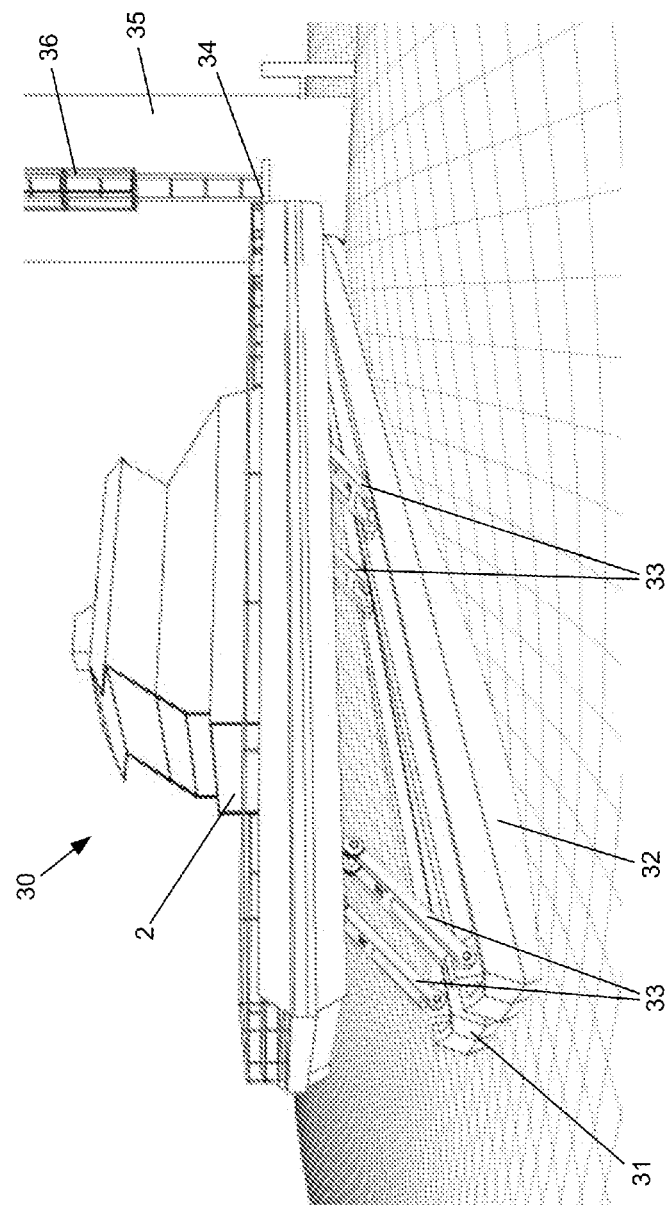
FIG. 3 is a perspective view of a vessel according to an alternative embodiment of the present invention.

FIG. 3 shows a catamaran vessel 30 with a body 2 suspended above a left and right hull 31 and 32. Suspension geometry, in this example trailing arms 33, is shown between the front of each hull and the body and between the back of each hull and the body. The deck of the vessel is provided as part of the body where multiple hulls are used. Gyroscopes as described above can be used to attenuate or control roll and/or pitch motions of the body. Due to the stabilising effect of the gyroscope(s), each of which is able to attenuate roll and/or pitch motions of the body, the suspension system is not required to provide all of the roll or pitch stabilisation of the body. Indeed, reducing the roll and/or pitch stiffness of the suspension between the hulls and the body can be advantageous. Similarly, active control of the suspension system to reduce the transmission of wave inputs to the body can be advantageous. Reducing or temporarily removing the roll and/or pitch stiffness of the suspension or active control of the suspension is readily accomplished when rams, air-springs or other devices providing controllable support of the body above the hulls are provided, for example as disclosed in the applicant's prior Australian patent and patent applications referenced above.

Figure 4:
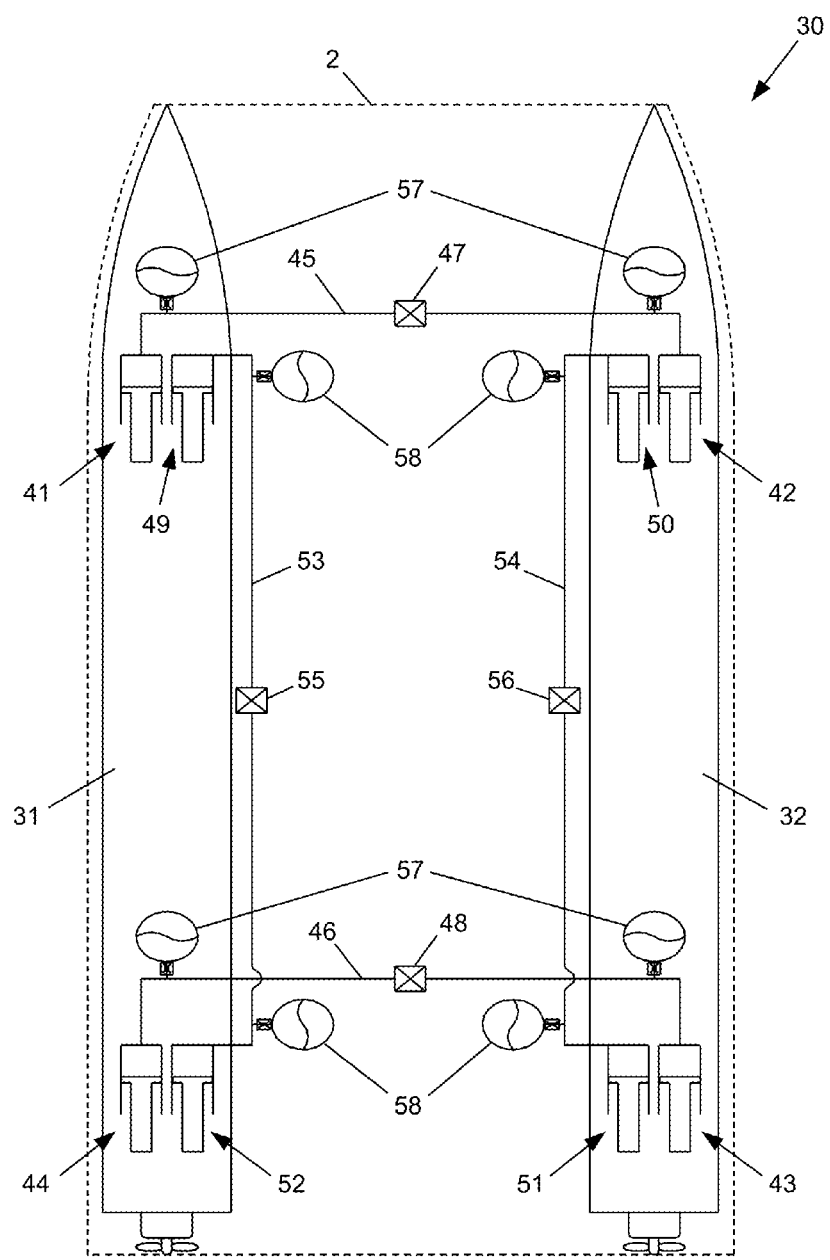
FIG. 4 is a schematic view of hydraulic components for a suspension system of a vessel according to an embodiment of the present invention.

FIG. 4 shows hydraulic or pneumatic components of an interconnected suspension system able to selectively provide zero roll and/or pitch stiffness (and if both, then additionally zero warp stiffness). The outlines of the hulls 31 and 32 are shown in plan view and the outline of the body 2 is shown in a dashed line. In this example, a roll ram 41, 42, 43 or 44 is effectively provided between the body 2 and the front and back portions of each hull. The rams can be located between the body and the mid-point of the suspension arms to provide a two to one motion ratio if required or at other locations still effectively between the hulls and the body. The front left roll ram 41 is interconnected to the front right roll ram 42 by front interconnection means 45 which provide effective fluid communication between the front left and front right roll rams. Similarly, back left roll ram 44 is connected to back right roll ram 43 by back interconnection means 46 which provide effective fluid communication between the back left and back right roll rams. The interconnection means 45, 46 may be a conduit providing fluid communication between the rams, or the interconnection means 45, 46 may include a sprung piston device to effectively allow transfer of fluid between the rams, but not direct fluid communication. Flow through the front and back roll interconnection means 45, 46 can be controlled by a respective valve 47 or 48 such as a damper and/or lock out valve that damps or selectively prevents (in an actual or effective sense) fluid flow between the interconnected rams. If the valves are open, fluid can flow between the left and right roll rams, and roll stiffness from the roll rams is removed.

Similarly in this example, a pitch ram 49, 50, 51, 52 is effectively provided between the body 2 and the front and back portions of each hull. The front left pitch ram 49 is interconnected to the back left pitch ram 52 by left interconnection means 53 and the front right pitch ram 50 is interconnected to the back right pitch ram 51 by right interconnection means 54. Flow through the left and right pitch interconnection means 53, 54 can be controlled by a respective valve 55 or 56 such as a damper and/or lock out valve to damp or selectively prevent (in an actual or effective sense) fluid flow between the interconnected rams. If the valves are open, fluid can flow between the front and back pitch rams, and pitch stiffness from the pitch rams is removed. In this example, the rams are all single acting in that each ram includes only a single compression chamber, and the rams can be air springs or hydraulic rams. While damping can be incorporated into hydraulic rams, fluid pressure accumulators are typically used to add resilience, as shown by the optional accumulators 57 and 58.

If just the roll rams 41, 42, 43 and 44 and roll interconnection means 45 and 46 with valves 47 and 48 are provided in a suspension system, the heave and pitch stiffness are fixed, but the roll and warp stiffness can be switched between zero with the valves open and a stiffness related to the heave and pitch stiffness when the valves are closed. If the pitch rams are also provided, they will provide an additional roll stiffness if the rams are single-acting and connected in pairs as shown in FIG. 4, so in that case opening the roll interconnection valves 47 and 48 will reduce but not totally remove the roll stiffness of the suspension system. However, connecting single-acting support rams to multiple chamber displacer units or using double-acting rams and cross-acting them in pairs such that the compression chamber of one ram is connected to the rebound chamber of the other ram can provide a greater flexibility in or disconnection between the relationships of the modal stiffnesses of the suspension system, i.e. roll, pitch, heave and warp stiffnesses, as is known in the art and discussed in the prior referenced patents and patent applications. There are then various ways to remove the stiffness in one or more modes of the suspension including the use of the interconnection means and valves discussed above.

For the catamaran shown in FIG. 3, at least a capability is provided to switch to substantially zero roll, pitch and/or warp stiffness. This may be achieved using the roll rams 41, 42, 43, 44, interconnections 45, 46 and valves 47, 48, and/or the pitch rams 49, 50, 51, 52, interconnections 53, 54 and valves 55, 56 shown in FIG. 4. However, any other suitable switchable stiffness or switchable modal stiffness suspension system as discussed above is envisaged.

Alternatively or additionally the resilience in the roll and/or pitch mode can be increased. Indeed if soft springs, that is independent resilient support means, are used to support the body above the hulls, this can provide a low natural frequency for heave motions and provide much lower roll and pitch torques into the body for given motions of the hulls. Such soft springs can be used to provide a relatively low roll and pitch stiffness, if the vessel has sufficient stability when at rest, for example in a marina, and with the gyrostabilizer(s) not operational, and if the gyrostabilizer(s) can provide sufficient stabilising torque(s) for ocean conditions.

If using hydraulic support rams, whether independent or interconnected, additional accumulators can be switchably communicated to increase the resilience. Hydraulic support rams also enable the stiffness of the suspension to be variably controlled and/or the positions of the hull(s) relative to the body to be actively controlled.

Alternatively, an active suspension using electrical generator actuators that can extract power from suspension compression motions and use provided power and/or the extracted power to drive suspension extension motions can be used either alone or in parallel with support springs (such as coil springs).

Whether switching or otherwise controlling the stiffness of the suspension in particular modes or actively controlling the suspension actuators, the more the roll and pitch torques input to the body from wave motions are reduced, the more able the gyroscope(s) will be to react to or oppose those torques. Reducing roll and pitch torques to the body from wave motions also enables the power required or the size of gyroscope needed to be reduced, and therefore the magnitude of wave inputs over which the body can be stabilised to be increased. Therefore if there is any method provided to control or switch the stiffness of the suspension in at least one or both of the pitch and roll modes, then when a gyroscopic stabilizer is operating to stabilise the corresponding mode or modes, the stiffness of the suspension system can be reduced or even substantially removed in the corresponding mode(s). Conversely, when no gyro stabilisation is operational in a roll or pitch mode, the stiffness of the suspension system in that mode (or in those modes) can be increased to ensure the stability of the vessel.

In FIG. 3 the vessel 30 is shown adjacent a pylon 35. A pitch stabilising gyroscope can be used on the body of the vessel 30 to control the pitch attitude of the body as mentioned above. For comfort the gyroscope would usually minimise changes in the pitch attitude of the body, but in this situation illustrated where people transfer from the bow 34 of the deck portion of the body 2 (or a gangway or platform extending forward of the bow 34) to the ladder 36 on the side of the pylon 35, minimising vertical motion between the bow of the deck and the ladder is most important for safety. For example, the gyroscope control system can use a reference point on the pylon and then minimise the vertical distance between the reference point and the bow of the body. This approach can be used in similar situations such as when the vessel is adjacent a landing jetty or mother-ship. Where the vessel is adjacent a relatively fixed structure such as a pylon or jetty (or the leg of a fixed oil rig), the gyroscope control system can use a vertical position of the bow (or other appropriate point where people are transferring from vessel to structure) and this vertical position can be derived from an accelerometer or by other known means. However, when the adjacent structure is moving, such as a mother-ship in the open ocean, the use of a reference point on the adjacent structure is advantageous.

Similarly any point can be chosen as the point to maintain at a constant vertical position, for example a point on the front or back deck can assist with cargo transfers by crane.

If people are embarking or disembarking from the bow of the vessel, a pitch stabilising gyroscope can be used to control the pitch angle of the vessel and maintain the bow at a constant vertical position relative to the desired reference point as waves pass under the hulls causing them to pitch and heave. Optionally (but preferably where the suspension system allows) the pitch stiffness of the suspension system can be reduced or removed during operation of the pitch gyroscope to reduce or remove the transmission of pitch forces from the hulls to the body.

If the vessel is thrusting into the pylon, contact is usually made between two spaced apart vertical beams on the pylon and the bumper on the bow of the vessel, the friction between the beams and the bumper helps maintain a constant height of the bow of the vessel on the pylon. However, roll forces on the body can cause the friction lock between the bumper and one of the bars to be temporarily lost, alternating between the bars the body can roll and the bow can walk up or down the pylon. Reducing or removing the roll stiffness of the suspension system can help prevent this alternating loss of position between bumper and one bar or the other. Using a roll stabilising gyroscope when the roll stiffness of the suspension system is reduced or removed can provide further stability benefits.

Figure 5:
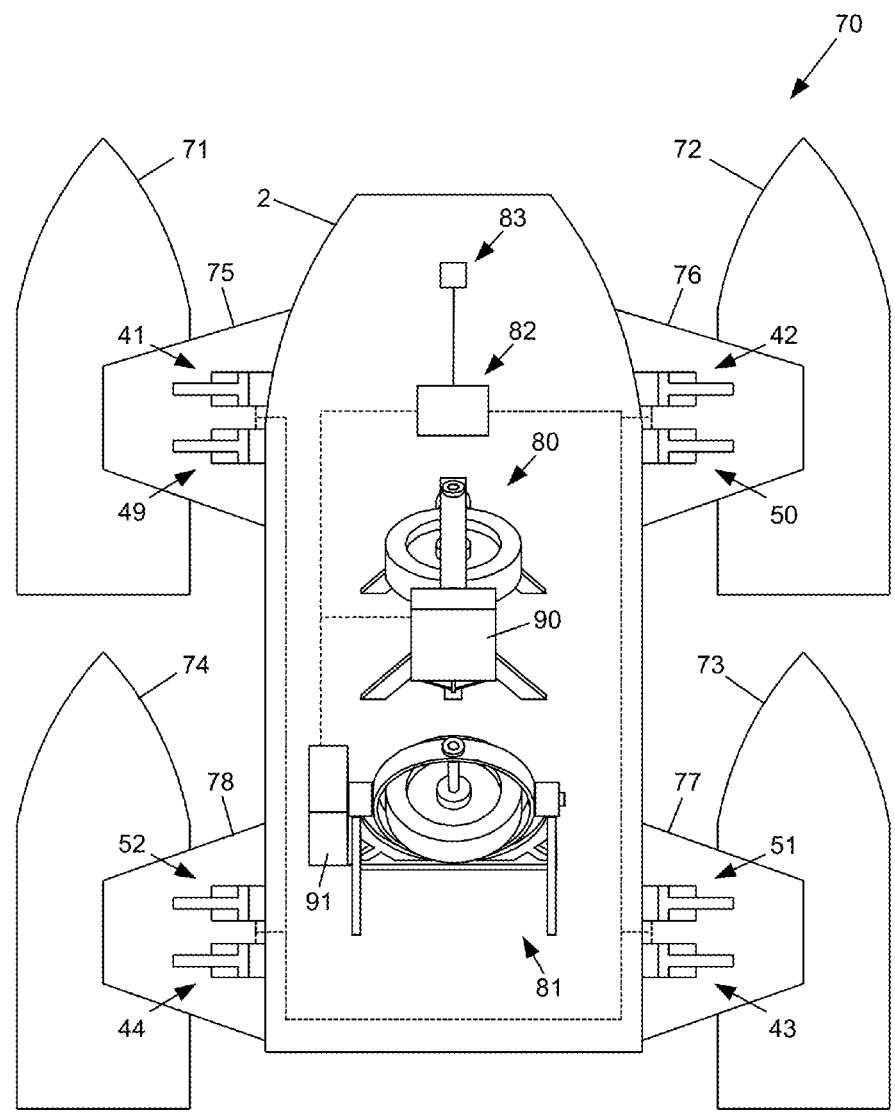
FIG. 5 is a schematic view of a quadmaran vessel incorporating suspension and gyrostabilizers according to an embodiment of the present invention.

Alternatively or additionally, the body could be suspended above more than two hulls. FIG. 5 shows a quadmaran 70 having a body 2 at least partially suspended above four hulls 71, 72, 73 and 74 respectively located relative to the body 2 by respective lateral wishbones 75, 76, 77 and 78 or other suitable suspension geometry. A suspension system comprising support rams 41, 42, 43, 44, 49, 50, 51, 52 or other suitable deformable or variable length devices is provided effectively between the hulls and the body as discussed above.

A pitch stabilising gyroscope 80 and a roll stabilising gyroscope 81 are also shown on the body portion 2 of the quadmaran 70 in FIG. 5. For reasons of clarity, components of an interconnected suspension system are omitted from FIG. 5, although it will be understood that in this example features corresponding to the interconnected suspension system components shown in FIG. 4 are also present in the suspension system shown in FIG. 5.

As discussed above, if a pitch stabilising gyroscope is provided, it is advantageous to utilise a suspension system able to reduce the pitch torques transferred to the body from wave inputs to the hulls. Similarly if a roll stabilising gyroscope is provided, it is advantageous to utilise a suspension system able to reduce the roll torques transferred to the body from wave inputs to the hulls. For this purpose, in this example, a control device 82 or system is provided to enable the stiffness or position of the suspension system in a roll or pitch mode to be controlled, for example in dependence on the operational state of the gyroscopic stabilizer.

Alternatively, the control device 82 may be arranged to control both the characteristics of the suspension system (by controlling valves 47, 48, 55, 56 communicating directly or indirectly with the rams 41, 42, 43, 44, 49, 50, 51, 52) and the stabilisation of the gyroscopic stabilizer(s) (by controlling precession control device(s) 90 or 91) in dependence on sensors 83. The sensors 83 can include suspension displacement sensors that detect the position of the hull(s) relative to the body, and/or a six axis sensor fixed to the body to detect displacement, velocity and/or acceleration along three perpendicular linear axes and about three perpendicular axes, and/or other running condition sensors such as throttle position, steering position, absolute velocity and water speed.

For example, while stationary in calm, protected waters, the control device 82 may control the characteristics of the suspension system such that the suspension system operates in a 'soft' to 'normal' stiffness setting with no gyrostabilisation operational. However, if there is a significant change in the position of the load, such as people moving from one side of the vessel to the other, it may be preferable to increase the stiffness of the suspension system to a 'normal' or 'high' stiffness setting. If the vessel is docked and being loaded in calm waters, the suspension system can be set to 'normal' or high' stiffness and gyrostabilisation activated, especially if the vessel is just docked or about to get underway. Once the vessel is underway, gyrostabilisation is preferably operational and the suspension system is preferably set to a 'normal' stiffness setting, although depending on the water speed and the sea state it may be beneficial to use a lower stiffness suspension setting, for example in a beam sea. When the vessel is docked against a second body, such as another vessel or the foundation of a pylon with the bow being thrust into the second body, a reference point can be chosen or detected on the second body, and the vertical position of the bow controlled to minimise any distance change between the bow of the vessel and the second body. In this case, where the bow of the vessel is being thrust against the second body, with friction between a bumper on the bow and the pylon, it may be preferable to reduce or remove the suspension stiffness in pitch. If the friction between the bow and the pylon is lost even momentarily, the precession control device of a pitch gyroscopic stabilizer may be operated to avoid the body moving rapidly in the pitch direction. Additionally or alternatively, if a roll gyroscopic stabilizer is operational, it is also preferable to reduce or remove the roll stiffness of the suspension system so that the roll gyroscopic stabilizer operates to maintain the roll position of the vessel. This helps reduce the changes in vertical friction load between the bow and the pylon which is typically at two laterally spaced apart points, thereby overcoming the problem with a conventional vessel that the friction lock between one of the two laterally spaced points can be momentarily lost and the bow can 'walk' up or down the pylon.

When the vessel is in the open ocean, close to a second body where the second body includes a crane to hoist cargo onto or off a cargo position on the body 2 of the vessel, the gyrostabilizer(s) and the suspension system can be controlled to minimise the motion of the cargo position on the body 2 of the vessel relative to the crane of the second body. Similarly, if the vessel is in the open ocean close to a pylon and a (passive or actively controlled) gangway is used for personnel transfer, the gyroscopic stabilizer(s) can be used to reduce or substantially prevent vertical motion of the gangway mounting position on the vessel relative to a reference point on the pylon. In both of these cases, the stiffness of the suspension can be reduced or removed about an axis that is being gyroscopically stabilised (i.e. pitch and/or roll).

The present invention can be applied to vessels with configurations other than those illustrated. For example, the body of the catamaran could engage with the water, being a central hull.

The body is typically suited to carrying people, cargo and equipment, i.e. payloads that can only withstand or that are preferably only subjected to a limited range of motion frequencies, amplitudes and accelerations.

The term body can mean the cabin or both the cabin and at least a portion of at least one deck. For example, when only one hull is used as shown in FIG. 1, at least a portion of the deck may be suspended, i.e. a forward portion of the deck may be fixed to the cabin and suspended above the single hull. When docking or transferring personnel to foundations of pylons in the ocean, the forward portion of the deck can be thrust into the foundation and at least one pitch or roll gyroscope used to control the attitude of the suspended deck and cabin to minimise vertical motion of the forward end of the forward portion of the deck to improve the safety of transfers. A portion of the deck may be fixed to the single hull to enable larger loads to be supported directly by the hull portion, enabling the suspension system to be designed for a more limited load range. The splitting of cargo deck between the suspended body and the hulls can be applied to multiple hull vessels also.

Modifications and variations as would be apparent to a skilled addressee are deemed to be within the scope of the present invention.

The claims that define the invention are as follows:

1. A vessel having:
   at least two hulls;
   a body; and
   a suspension system for supporting at least a portion of the body above the at least two hulls, the suspension system including:
   at least one support means between each hull and the body; and
   locating means, each respective locating means locating a respective hull relative to the body;
   wherein the vessel further includes at least one gyroscopic stabilizer for attenuating rotation of the body about at least one stabilizing axis.

2. A vessel as claimed in claim 1, wherein the or each at least one gyroscopic stabilizer includes a flywheel connected to a spin shaft such that the flywheel is able to spin about a spin axis, the spin shaft being connected to a gimbal frame, the gimbal frame being rotatably connected to the body of the vessel such that the gimbal frame is able to rotate about a precession axis, the spin axis being substantially perpendicular to the precession axis; and
   wherein the rotation of the gimbal frame about the precession axis is damped by a precession control device.

3. A vessel as claimed in claim 2 wherein the precession control device is controllable to reduce or maintain a distance between a point on the body of the vessel and a reference point.

4. A vessel as claimed in claim 1, wherein the or each at least one gyroscopic stabilizer includes a flywheel connected to a spin shaft such that the flywheel is able to spin about a spin axis, the spin shaft being connected to a gimbal frame, the gimbal frame being rotatably connected to the body of the vessel such that the gimbal frame is able to rotate about a precession axis, the spin axis being substantially perpendicular to the precession axis; and
   wherein the rotation of the gimbal frame about the precession axis is driven by a precession control device.

5. A vessel as claimed in claim 4 wherein the precession control device is controllable to reduce or maintain a distance between a point on the body of the vessel and a reference point.

6. A vessel as claimed in claim 1, wherein the suspension system is controllable so as to selectively increase or reduce the pitch, roll and/or warp stiffness.

7. A vessel as claimed in claim 1, wherein the at least two hulls includes at least one left hull and at least one right hull.

8. A vessel as claimed in claim 7, wherein the at least one support includes at least a left fluid-filled support between the or each left hull and the body and at least a right fluid-filled support between the or each right hull and the body, the left and right fluid-filled supports interconnected by interconnection means.

9. A vessel as claimed in claim 8, wherein the interconnection means is controllable to provide fluid communication or permit effective fluid transfer between the left and right fluid-filled supports such that the left and right fluid-filled supports provide substantially zero stiffness in response to roll and/or pitch motions of the body relative to the at least one hull.

10. A vessel as claimed in claim 8, wherein the interconnection means include control means for selectively limiting or selectively preventing said fluid communication or effective transfer of fluid.

11. A vessel as claimed in claim 10, wherein the control means limits or selectively prevents said fluid communication when said at least one gyroscopic stabilizer is not in operation.

12. A vessel as claimed in claim 7, wherein the at least one support between each hull and the body includes:
   at least a front left support and a back left support connected between the at least one left hull and the body;
   at least a front right support and a back right support connected between the at least one right hull and the body.

13. A vessel as claimed in claim 12, wherein the suspension system includes at least one interconnection means for providing an interconnection between at least two of said supports.

14. A vessel as claimed in claim 13, wherein the front left, back left, front right and back right supports each include at least a respective fluid filled compression chamber,
the at least one interconnection means controllable to provide fluid communication or permit effective transfer of fluid between at least two of said fluid filled compression chambers to thereby provide substantially zero stiffness in a roll, pitch and/or warp mode of the front left, back left, front right and back right supports.

15. A vessel as claimed in claim 13, wherein the interconnection means include control means for selectively limiting or selectively preventing said fluid communication or effective transfer of fluid.

16. A vessel as claimed in claim 15, wherein the control means limits or selectively prevents said fluid communication when said at least one gyroscopic stabilizer is not in operation.

17. A vessel as claimed in claim 12, wherein each of the front left, front right, back left and back right supports includes a respective controllable support device and the suspension system further includes an active control system for controlling the controllable support devices.

18. A vessel as claimed in claim 17, wherein the active control system reduces the torques transmitted by the suspension system to the body, from wave inputs to the hulls, about the at least one stabilized axis when the at least one gyro stabilizer is in operation.

19. A vessel as claimed in claim 7, wherein the at least one left hull, the at least one right hull and the body engage with a water surface.

20. A vessel as claimed in claim 7, wherein the at least one left hull and the at least one right hull engage with a water surface and the suspension system supports the body above the water surface.

21. A vessel as claimed in claim 1, wherein the or each at least one support means between each hull and the body includes an independent resilient support means.

22. A vessel as claimed in claim 1, wherein the or each at least one support means between each hull and the body includes an interconnected support means and an independent resilient support means.

* * * * *